US008346633B2

(12) United States Patent
Harrer

(10) Patent No.: US 8,346,633 B2
(45) Date of Patent: Jan. 1, 2013

(54) SYSTEM AND METHOD FOR LOW LEVEL CODE CALCULATION

(75) Inventor: Karl Harrer, Landshut (DE)

(73) Assignee: SAP AG, Walldorf (DE)

( * ) Notice: Subject to any disclaimer, the term of this patent is extended or adjusted under 35 U.S.C. 154(b) by 146 days.

(21) Appl. No.: 12/569,801

(22) Filed: Sep. 29, 2009

(65) Prior Publication Data

US 2011/0077763 A1 Mar. 31, 2011

(51) Int. Cl.
*G06Q 10/00* (2006.01)
*G06F 19/00* (2006.01)

(52) U.S. Cl. .......................................... 705/28; 700/107
(58) Field of Classification Search ...................... 705/28
See application file for complete search history.

(56) References Cited

U.S. PATENT DOCUMENTS

| | | |
|---|---|---|
| 4,862,376 A | 8/1989 | Ferriter et al. |
| 5,119,307 A | 6/1992 | Blaha et al. |
| 5,197,001 A | 3/1993 | Mukherjee |
| 5,515,269 A | 5/1996 | Willis et al. |
| 5,796,614 A | 8/1998 | Yamada |
| 5,943,484 A | 8/1999 | Milne et al. |
| 6,701,201 B2 | 3/2004 | Hegde et al. |
| 6,819,967 B2 * | 11/2004 | Ballas et al. .................. 700/107 |
| 2005/0177479 A1 * | 8/2005 | Wei ................................. 705/34 |

OTHER PUBLICATIONS

"Atomic Data Generation and Collisional Radiative Modeling of AR II, AR III, and Ne I for Laboratory and Astrophysical Plasmas", Jorge Manuel Munoz Burgos, Aug. 10, 2009.*

* cited by examiner

*Primary Examiner* — Garcia Ade

(57) ABSTRACT

A computer-implemented method for re-calculating low level codes for a plurality of bill of materials that receives a list of a plurality of materials connected by a first set of edges that represent a component subcomponent relationship and a second set of edges that represent a co-product relationship. The same low level code may be assigned to each material connected by the second set of edges, the assigning includes forming at least one equal group. Each equal group may include the number of nodes in the equal group, a list of nodes in the at least one equal group that have been processed, and the low level code for the equal group. The results of the low level code assignment may be displayed to allow the user to receive the materials in the equal group at the same time.

18 Claims, 8 Drawing Sheets

FIG. 7

SYSTEM AND METHOD FOR LOW LEVEL CODE CALCULATION

BACKGROUND

Material planning for various large projects in the modern manufacturing environment can be a challenging endeavor. For example, a bill of materials (BOM) for a complex piece of equipment such as an airplane or automobile may comprise an extensive lists of materials (e.g., raw materials, sub-assemblies, intermediate assemblies, sub-components, components, parts, etc.). Even for less complex manufactured goods, material planning remains a challenging endeavor. For material planning purposes, it is often desirable to place parts in a multi-level hierarchy of components and subcomponents. As will be appreciated, most manufactured goods may have hierarchies with many levels, with the number of levels increasing as the complexity of the manufactured good increases. Typically, each part in the hierarchy is assigned a code corresponding to its location in the hierarchy. If a sub-component changes, then the parts need to be resorted into a new hierarchy and the codes are recalculated.

SUMMARY OF THE DISCLOSURE

A computer-implemented method for re-calculating low level codes for a plurality of bill of materials that receives a list of a plurality of materials connected by a first set of edges that represent a component subcomponent relationship and a second set of edges that represent a co-product relationship. The same low level code may be assigned to each material connected by the second set of edges, the assigning includes forming at least one equal group. Each equal group may include the number of nodes in the equal group, a list of nodes in the at least one equal group that have been processed, and the low level code for the equal group. The results of the low level code assignment may be displayed to allow the user to receive the materials in the equal group at the same time.

BRIEF DESCRIPTION OF THE DRAWINGS

FIG. 7 is a screen display that may be shown to the user showing an example output of the low level code calculation.

DETAILED DESCRIPTION

Figure 1:
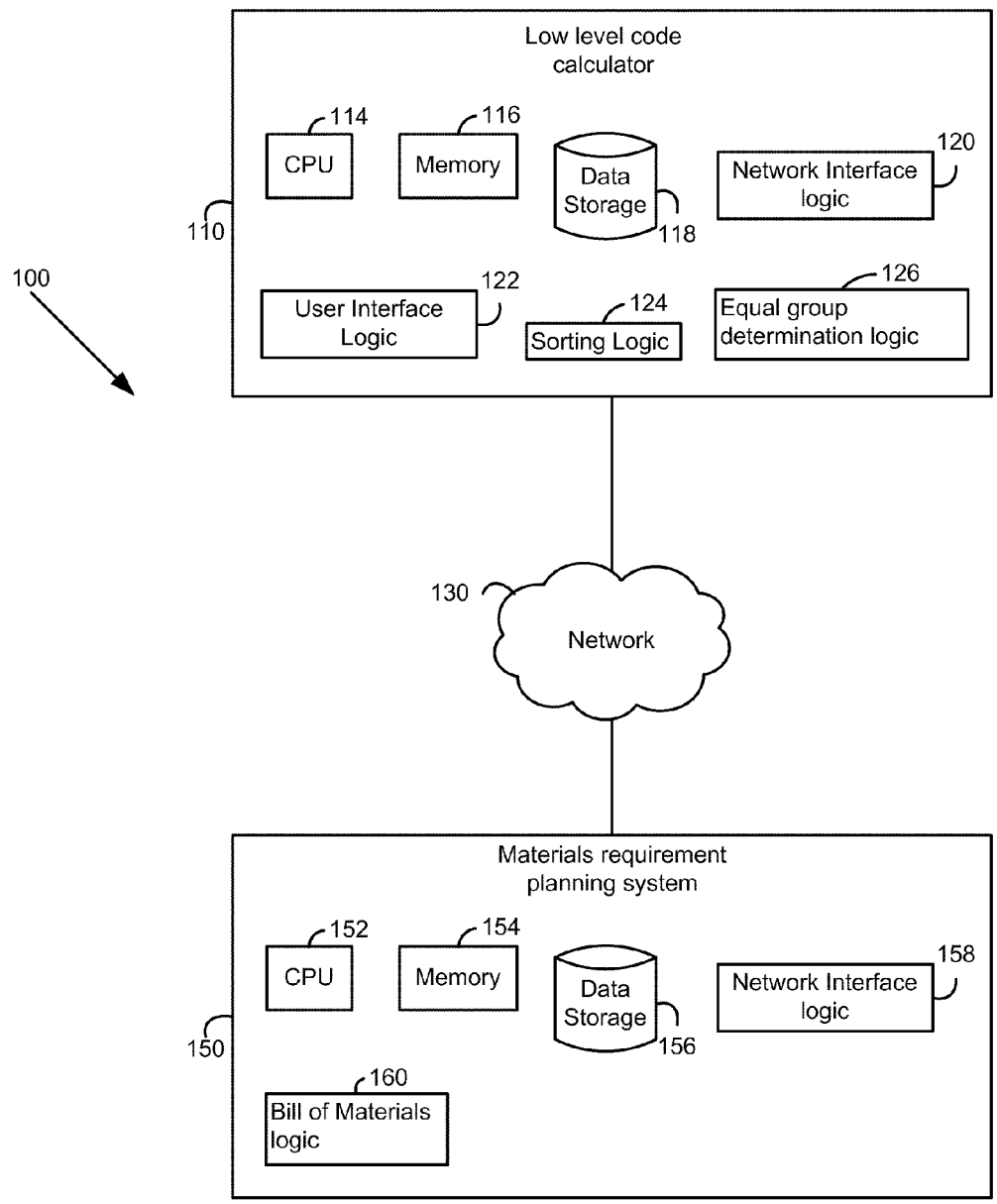
FIG. 1 is a schematic diagram of a low level code calculator according to an embodiment of the present invention.

Referring to FIG. 1, FIG. 1 shows a schematic diagram of a system 100 according to an example embodiment. The system 100 may include a low level code calculator 110, network 130 and materials requirement planning system 150. In an example embodiment, the low level code calculator 110, and materials requirement planning system 150 may each be implemented using several computing systems that may be connected via a network. Similarly, in another example embodiment, the low level code calculator 110, and materials requirement planning system 150 may be implemented on a single computing system. Other arrangements are also possible.

The low level code calculator 110 may include, among other systems, a central processing unit (CPU) 114, memory 116, data storage 118, network interface logic 120, user interface logic 122, topological sorting logic 124, and equal group determination logic 126. The low level code calculator 110 may include a computing system programmed to perform the various functions described herein. These functions include generating a user interface, and/or sending and receiving request for a bill of materials for various projects to the requirement planning system 150 via the network interface logic 120. These functions may further include, processing the bill of materials and calculating a new set of low level codes for each material based in part on a co-product relationship.

The CPU 114 may be a single processor with a finite amount of cache memory on chip. In other embodiments, the CPU 114 may be a plurality of networked processors that share a large random access memory. The CPU 114 may be used to process, compute instructions, manipulate data or implement various sorting algorithms including a topological sorting algorithm. The memory 116 may be used primarily to store data for CPU 114 to access.

Network interface logic 120 may facilitate the communication between the low level code calculator 110, requirement planning system 150 via the network 130. The network interface logic 120 permits the low level code calculator 110, and requirement planning system 150 to connect the each other and/or the other computer systems.

The user interface logic 122 may be configured to generate user interfaces based on the information received from the requirement planning system 150 and/or other systems. The user interface logic 122 may receive input from the user and process the input as a search criteria or an input in the form of a mouse and/or a keyboard. In another embodiment, other electronically interactive devices may be used.

The low level code calculator 110 may comprise application program logic (e.g., stored in computer readable storage media), including topological sorting logic 124 and equal group determination logic 126. The sorting logic 124 may include byte code that is configured to perform a sort on a directed acyclic graph and bidirected graph. In one example embodiment, a depth-first search may be used to perform a topological sort on a directed acyclic graph. A graph may comprise nodes that are connected by directional edges. Each node may represent a material and each edge may represent a component subcomponent relation between the nodes. As will be discussed in greater detail below, an extended topological sort may be performed based on the presence of equal edges.

The equal group determination logic 126 may include program logic that is configured to perform grouping between various nodes with particular type of connecting edges. In one example embodiment, the equal group determination logic 126 may be used to determine which nodes/materials have a co-product relationship. Once it is determined that a group of nodes have a co-product relationship, meaning the products may be generated at the same time, they may be connected by a new equal edge and thus the nodes connected by an equal edge may be members of an equal group. As will be discussed in greater detail below, each member in the equal group will be assigned the same low level code by the sorting algorithm.

In an example embodiment, the requirement planning system 150 may include, a CPU 152 memory 154, data storage 156, network interface logic 158 and bill of materials 160. Such logics referred to in this disclosure may, in practice, be implemented in a machine (e.g., one or more servers and other computers) comprising machine-readable storage media (i.e. cache, memory, flash drive or internal or external hard drive or in a cloud computing environment) having instructions stored therein which are executed by the machine to perform the operations described herein. The bill of materials logic 160 may be a program product that may process and provide the bill of materials for a large industry scale project with thousands of materials.

In an example embodiment, the low level code calculator 110 and requirement planning system 150 may be provided by a software development company. In another embodiment, the low level code calculator 110 and requirement planning system 150 may be provided by an entity that uses software provided by a software development company. Likewise, other combinations are also possible.

The low level code calculator 110 may offer users the ability to specify that certain materials should have the same low level codes. This may be desirable in certain instances, for example, where two materials are co-products. For example, a BOM may list a variety of materials including gasoline. If an entity performs its own petroleum processing, such that it orders crude oil and processes the crude oil into gasoline, then a co-product of the gasoline is diesel fuel. That is, when the entity processes the crude oil, it generates both gasoline and diesel fuel. It may be desirable to specify that gasoline and diesel fuel should be members of an equal group (i.e., a group having members which have the same low level codes in the BOM), so that the production/utilization of gasoline and diesel fuel may be coordinated, e.g., to avoid surpluses of diesel fuel from developing when the gasoline is produced. Another example of coproducts may be when flour is made from grain, co-products are bran and semolina. By permitting a material to specify that the same low level code should be assigned to each material that is a co-product, the material planner may be given the ability to account for co-products and build in the utilization of each co-product when it is generated instead of determining what to do with the co-product only after it is produced. Thus, during material-requirements-planning (MRP), each coproduct may be planned at the same step, which may impact the timing of the consumption of each of the coproducts. Specifically, while not guaranteeing any particular end result, it enhances the likelihood that all of the coproducts will be consumed at about the same time, rather than having surpluses of one or more of the coproducts for an extended period of time.

Figure 2:
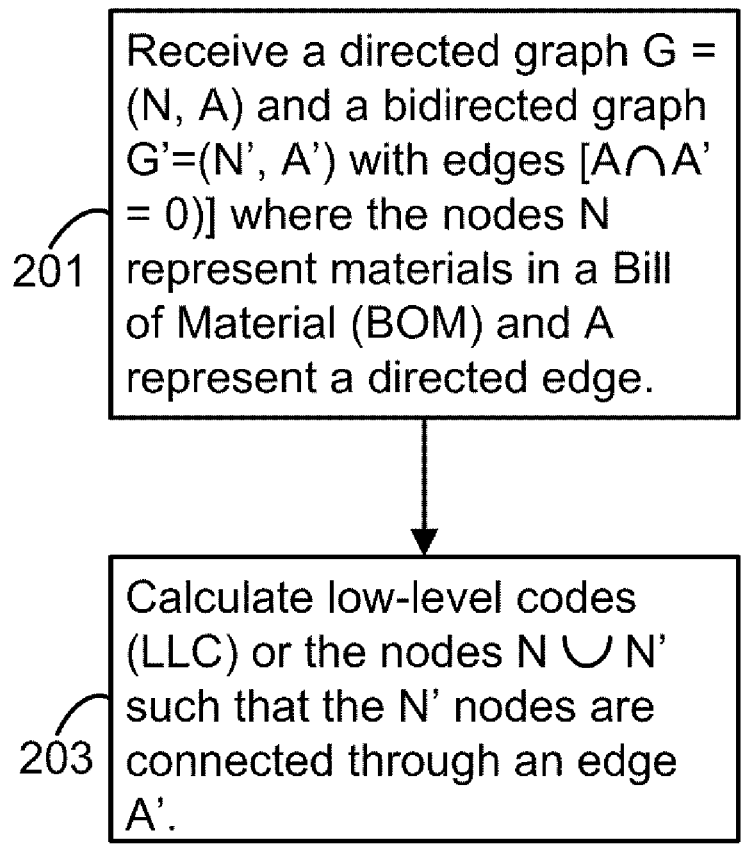
FIG. 2 is an example process that may be implemented using the system shown in FIG. 1.
Figure 3A:
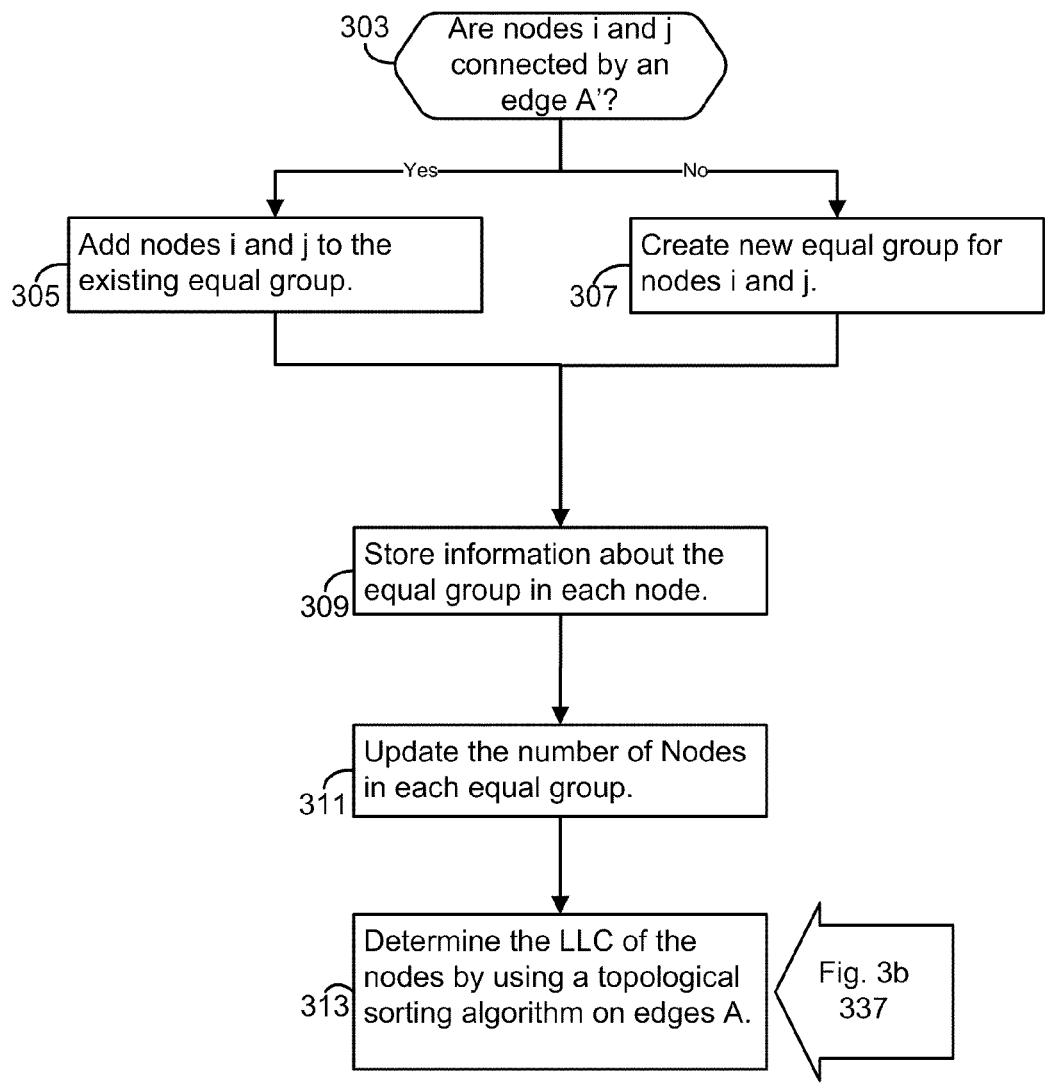
FIG. 3a is another example process that may be implemented using the system shown in FIG. 1.
Figure 3B:
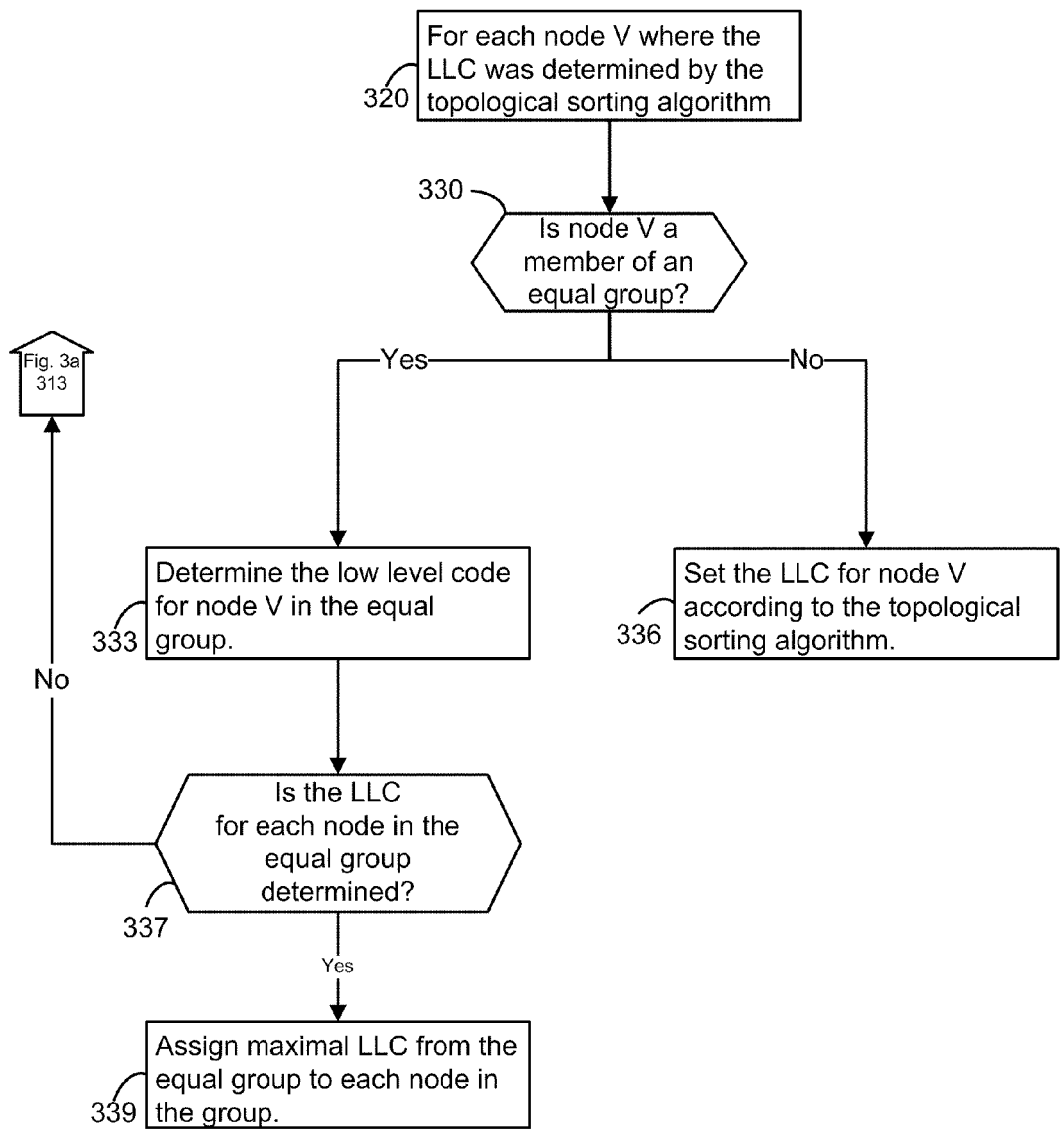
FIG. 3b is another example process that may be implemented using the system shown in FIG. 1.
Figure 4:
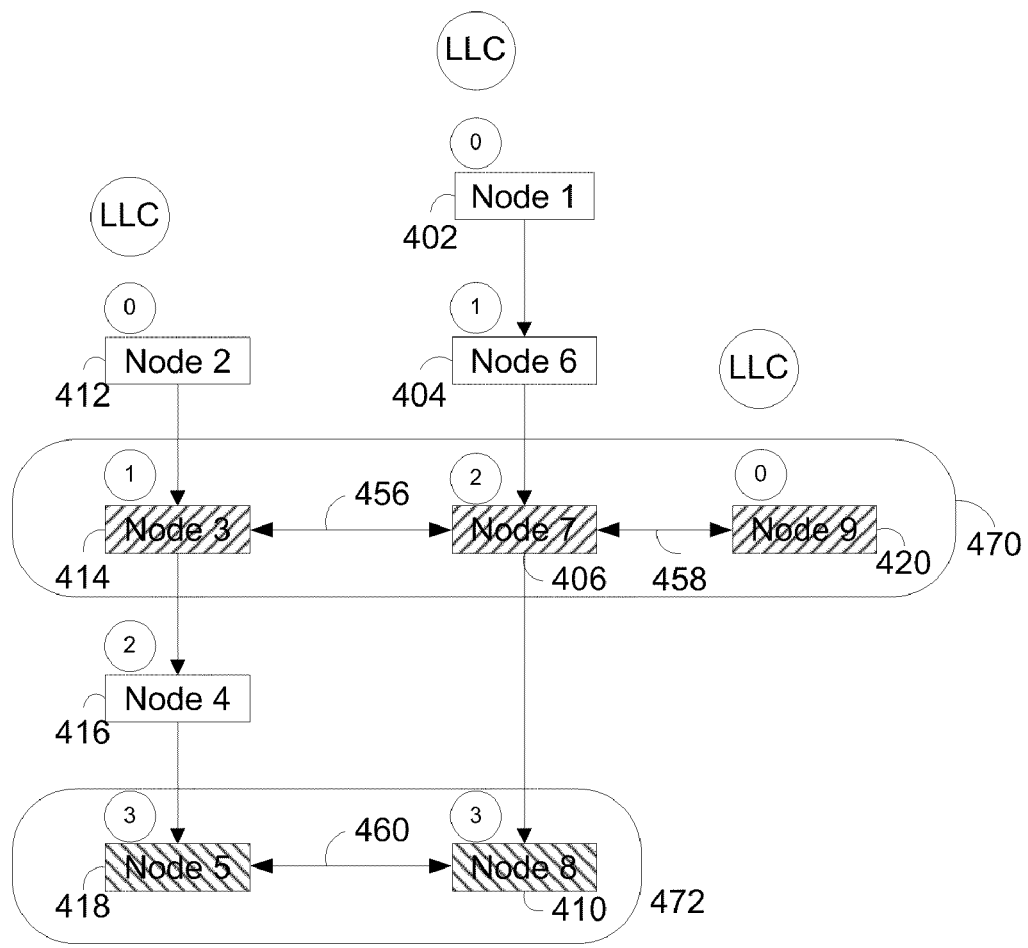
FIG. 4 is an example graph showing low level code assignments and grouping of nodes with equal edges.
Figure 5:
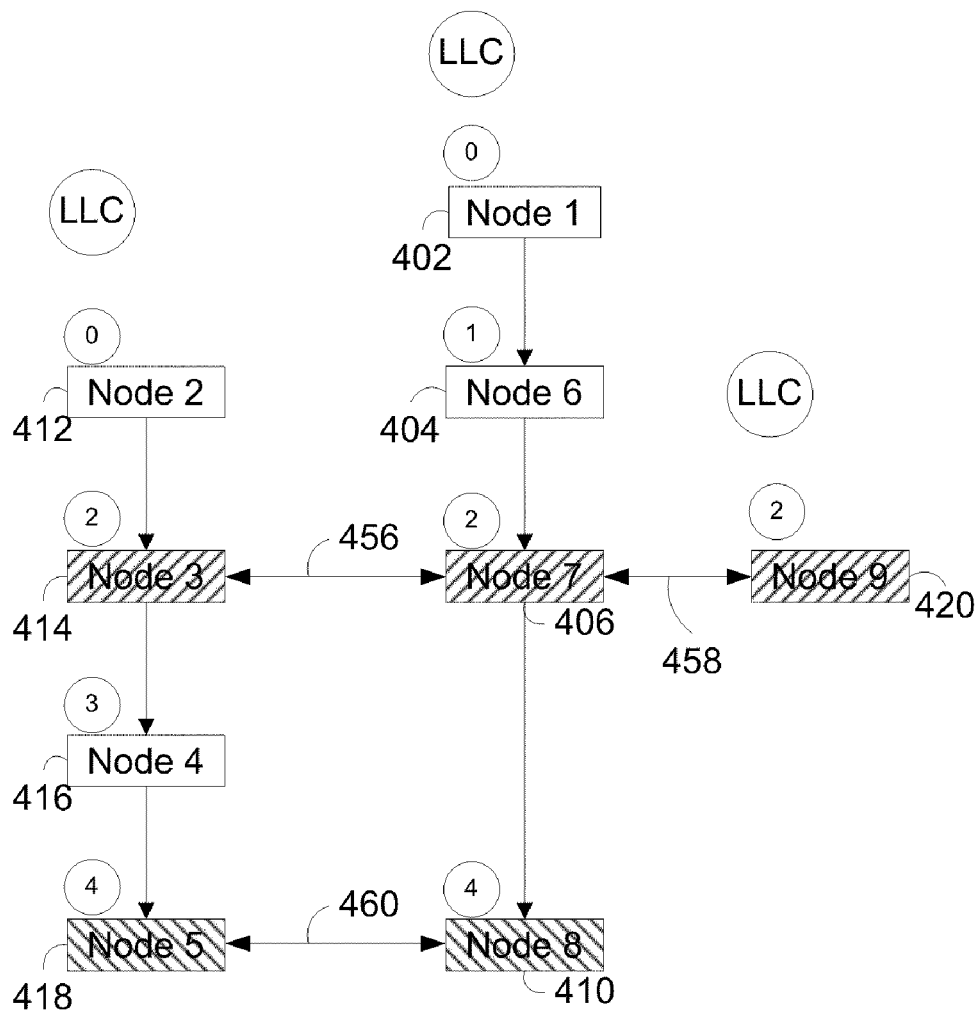
FIG. 5 is an example graph showing re-calculated low level codes for the graph in FIG. 4 based in the process shown on FIG. 2 through FIG. 4.

Referring now to FIGS. 2, 3a-3b, 4 and 5, operation of the low level code calculator 110 is shown in greater detail. FIGS. 2 and 3a-3b provide a formalistic description of an algorithm that may be employed by the low level code calculator. FIGS. 4 and 5 provide a specific example of the operation of the low level code calculator 110.

Referring first to FIG. 2, at step 201, the low level code calculator 110 may receive a directed graph $G=(N, A)$ and a bidirected graph $G'=(N', A')$ where N is a first set of nodes,
N' is a second set of nodes,
A is a first set of edges, and
A' is a second set of edges.

The edges A are directed edges and the edges A' are equal edges. The sets of edges A and A' are non-intersecting edges $[A \cap A'=0]$. The sets of nodes N and N' may be overlapping $[N \cap N' \neq 0]$. Each nodes N, N' represents a material (e.g., a raw material, a sub-assembly, an intermediate assembly, a sub-component, a components, a part, etc.) listed in the bill of materials.

In practice, the directed graph G may be received as a bill of materials which comprises a multi-level hierarchical listing of materials. The bill of materials may be generated by a computer-aided design package or other computer-implemented tool, for example. The edges A may represent component-subcomponent relationships between various materials (i.e., nodes N) in the bill of materials. This information is embedded in the hierarchical relationships specified in the bill of materials. The bidirected graph G' may be received as information specified by a user via user interface logic 122. For example, the user may specify that gasoline (N1') and diesel fuel (N2') are co-products. Such co-products are then to be connected by an equal edge A1'. Because the edges A connect nodes which are in a component-subcomponent relationship, whereas the edges A' connect nodes which are in an equal group relationship, the edges A and A' are non-intersecting edges $[A \cap A'=0)]$, as previously indicated. Conversely, a large bill of materials may comprise many materials (nodes N), a subset of which (nodes N') are specified as needing to be part of an equal group. Hence, the sets of nodes N and N' may be overlapping $[N \cap N'^* \neq 0]$, as also previously noted. In other example embodiments, the nodes N and N' may be from a composite graph for two ore more bills of materials. (e.g., one for vehicle A which uses gasoline and one for vehicle B which uses diesel fuel in the above example).

At step 203, the low level code calculator 110 may calculate the low level codes (LLC) for the nodes $N \cup N'$ such that the N' nodes that are connected through an edge A' have the same LLC. The low level code calculator 110 may assign each N' node the same LLC. Each A' edge may be considered an equal edge that was introduced in the original directed graph $G=(N, A)$ to generate a bidirected graph $G'=(N', A')$. Operation of the algorithm in this regard is described in greater detail below with regard to FIGS. 3a-3b.

Referring now to FIG. 3a, FIG. 3a shows a process in which the low level code calculator 110 may determine groups of N' that are within the same equal group. At step 303, a determination is made whether either of two nodes i or j is part of an existing equal group (where i and j are connected by an edge of A'). Nodes i and j are presumed to be materials that have been specified to be co-products as described above (e.g., gasoline and diesel fuel). The co-products relationship information may be maintained in the BOMs. The BOM may specify that two nodes in the hierarchy need to be treated as co-products, leaving it to the algorithm to find other occurrences of the same material in the BOM that need to be treated as co-products. As may be appreciated, any given material may appear at various locations in a bill of materials (i.e., there may be multiple nodes N' that all refer to the same material and other multiple nodes N' that all refer to its co-product). If either node i or j is a member of an existing equal group, then nodes i and j are added to the existing equal group at step 305. For example, two nodes that refer to gasoline and diesel fuel may be added to an existing equal group that has already been created and that includes other nodes that refer to gasoline and diesel fuel. If nodes i and j are not part of an equal group, then a new equal group is created for nodes i and j at step 307. At step 309, the low level code calculator 110 may store the information about the equal group in each node. The information may include updating the number of nodes in each equal group at step 311. At step 313, the low level codes of the nodes may be determined by using a topological sorting algorithm that includes the steps from FIG. 3b.

The topological sorting algorithm may be conducted on a acyclic directed graph where all nodes are placed in a linear ordering in which each node is listed before all modes to which it has outbound edges. At a basic level, the algorithm may first find all nodes that have no edges pointing to them or have an in degree of 0. Next, those nodes may be assigned the lowest low level code and that node may be removed from the graph. Then, the above two steps are repeated until all the nodes have been assigned a low level code. In other embodiments, topological sorting algorithm may use various other data structures to store the graph and the order. For example, the graph structure may be stored in a linked list, another integer array may be used that keeps track of the low level code for each node, and a queue may be used to determine which node to process next. An example topological algorithm is shown below:

```
L ← Empty list that will contain the sorted elements
S ← Set of all nodes with no incoming edges
while S is non-empty do
    assigned a node n a low level code from S
    insert n into L
    for each node m with an edge e from n to m do
        remove edge e from the graph
        if m has no other incoming edges then
            assign m a low level code
            insert m into S
    if graph has edges then
        output error message (graph has at least one cycle)
        else
        output message (proposed topologically sorted order: L)
        assign low level codes to L based on the order.
```

Referring to FIG. 3b, FIG. 3b is a process in which the low level codes are determined for each node N, N' based on the equal groups determined in FIG. 3a. In particular, for each node V where the LLC was determined by the topological sorting algorithm, the process of FIG. 3b may be included in determining the low level code. In particular, at step 330, the low level code calculator 110 may determine whether a node v is a member of an equal group (where v is one of the nodes N and potentially one of the nodes N'). If node v is not a member of an equal group then at step 336, the low level code for v is set. If node v is a member of the equal group, then at step 333, the LLC of node v is stored in the equal group. At step 337, if the low level code for each node in the equal group has been determined then the process moves to step 339. If the low level code for each node in the equal has not been determined then the process returns to step 313 of FIG. 3a where the process determines the LLC of the nodes by using a topological sorting algorithm on edges A. The process of step 330 and 333 repeats until a low level code is determined for all nodes in the equal group, with each low level code being stored in a storage area. Lastly, at step 339, the low level calculator 110 may assign the low level code from the storage area to each node that is a member of the equal group. In an example embodiment, the group low level code is the numerically highest low level code of any member in the group. Every node in the group is thus assigned the highest low level code determined in step 333.

FIGS. 4 and 5 provide an example of the operation of the algorithm shown in FIGS. 2-3b. Referring first to FIG. 4, FIG. 4 is an example graph showing low level code assignments and grouping of nodes with equal edges of a multilevel bill of material. As shown in the graph, nodes at the highest level have a low level code 0 assigned to them for example see, node 1, node 2 and node 9. Node 6 is connected to node 1 by a directed edge that represents that fact that the material representing node 6 is used to create (is a subcomponent of) the material of node 1. Similarly, the material of node 8 is needed to create material of node 7 and the material of node 7 is needed to create the material of node 6. In this example, based on directed graph, Node 1 is assigned low level code 0 and node 6 is assigned a higher low level code such as 1, and node 7 is assigned low level code 2 and node 8 is assigned low level code 3. The same is true for nodes 2, 3, 4, and 5 which are assigned low level codes 0, 1, 2, and 3, respectively.

The user interface logic 122 may maintain the specification of co-products in the bill of material or may receive a specification of co-products from the use. The low level code calculator 110 may introduce equal edges 456, 458 and 460. Nodes 3 and 7 are connected by equal edge 456 and nodes 7 and 9 are connected by equal edge 458. The equal edges represent a co-product relationship between the nodes, for example, nodes 7 and 9, which may be materials that are created at the same time. Similarly nodes 5 and 8 are connected by equal edge 460 and they may considered co-products that may be created at the same time. Once the graph with the equal edges is created, the low level code calculator 110 determine which nodes belong to an equal group. For example nodes 3, 7 and 9 belong to the equal group 470, since they are each connected by equal edges 456 and 458, shared by node 7. Similarly, nodes 5 and 8 are members of equal group 472. Members of the same equal group should have the same low level codes so that they may be planned at the same step of the MRP run. Therefore, members of each equal group should be assigned the same low level code.

Referring to FIG. 5, FIG. 5 is an example graph showing the manner in which low level codes may be calculated for a graph representing a bill of materials based on the process shown on FIG. 2a through FIG. 3b. As will be appreciated, such operations may occur during the execution of the topological sorting algorithm. Node 2 with no edges pointing to it may be assigned a low level code of 0. Since node 3 is a member of an equal group, node 3 may be assigned the highest low level code amongst the group once all the nodes in the equal group have been processed. In the interim based on node 2, low level code 1 is stored for node 3. Once an equal group member is reached for processing, the process may determine whether all the nodes in the equal group have been processed. If all the nodes have been processed, then the highest low level code from all the nodes in the equal group is assigned to all the nodes in the equal group. Next, Node 1 may be assigned a low level code of 0 and node 6 as 1. Since node 7 is connected by equal edge 456 it is a member of an equal group, based on node 6 low level code 2 is stored for node 7. The process goes to the next node with no edges node 9. Since 9 is connected by equal edge 458, it is a member of an equal group and since node 9 is the last member of the equal group low level code 0 is temporarily stored for node 9. Next the process determines the highest low level code stored for each node in the equal group. In this example, node 7 has the highest low level code of 2, thus all the nodes, nodes 3 and 9 are assigned low level code 2.

Next the algorithm may process the next node that has not been processed such as node 4 and assigns node 4 low level code 3 based on the parent node 3 being assigned low level code 2. Since node 5 is connected by equal edge 460, it is a member of an equal group, low level code 4 is stored for node 5. Next the algorithm goes to the next node that has not been processed node 8, since node 8 is connected by an equal edge 460 it is a member of an equal group. Based on the parent node 7, low level code 3 would be assigned to node 8, but since node 5 has a higher low level code, node 8 is assigned low level code 4.

Figure 6:
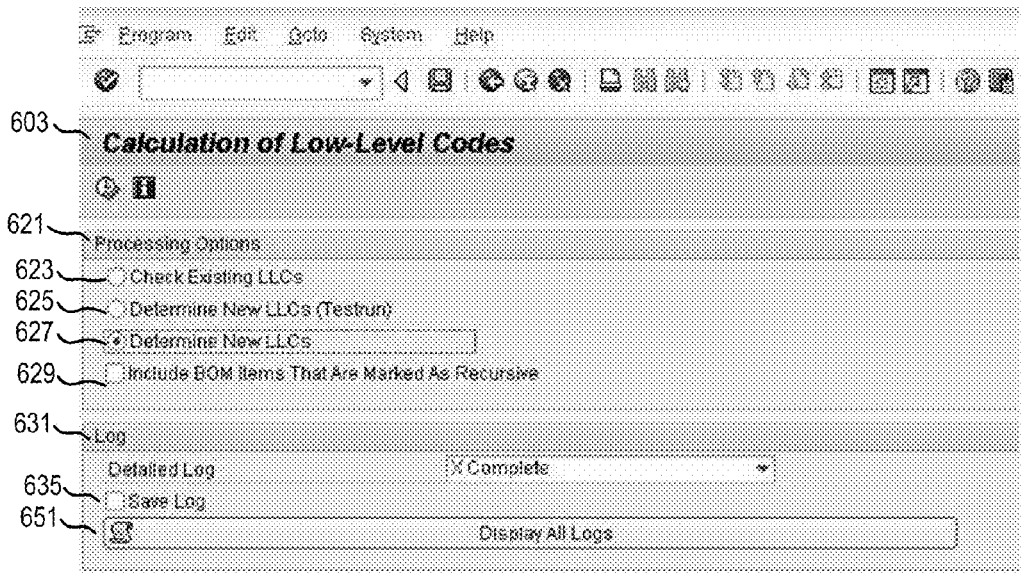
FIG. 6 is a screen display that may be shown to the user to allow the user to choose which operation to run in the embodiment of the present invention.

FIG. 6 is a screen display that may be shown to the user to allow the user to choose which operation to perform. The materials planner may be shown a calculation of low-level cods screen 603, where the user is provided with various processing options 621. The processing options include check existing LLCs 623, Determine new LLCs (Testrun) 625, determine new LLCs 627. With each of the above options, the user may choose to include BOM items that are marked as recursive in checkbox 629. In one embodiment of the present invention, the BOM may be retrieved from the material requirement planning system 150. The user is also presented with the option of creating a log 631 with varying level of details. Check box 635 allows the user the option to save the log in the storage system for later viewing. Lastly the user may click on button 651 which will display the logs. After choosing determine new LLCs 627 option and clicking button 651, a screen such as FIG. 7 may be displayed.

Figure 7:
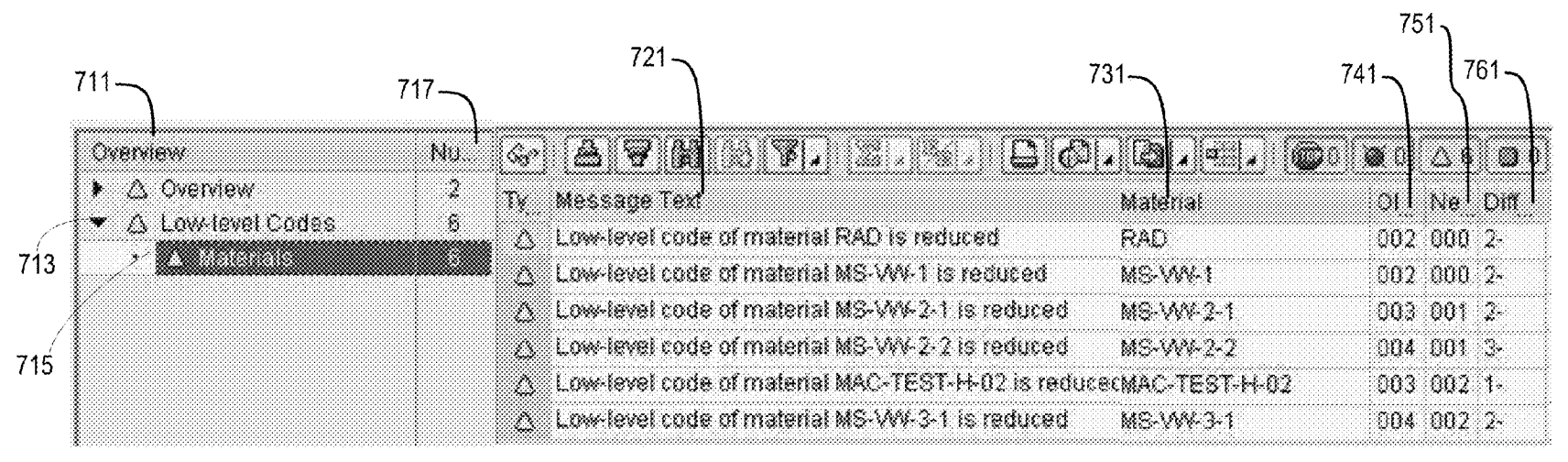

FIG. 7 is a screen display that may be shown to the user showing an example output of the low level code calculation. An overview 711 is provided that includes low-level codes 713 which further includes material 715. In this example embodiment, the number of low level codes and the total number of materials may be shown. Each time the low level code of a material is changed according to the algorithm described above a text message 721 may be shown, also the material name 731 may also be shown. In an example embodiment the old low level code 741 and the new low level code 751 may also be shown. In the example embodiment shown in FIG. 7 the difference between the old low level code and the new low level code may also be shown.

By assigning the same low level code to each material that is a co-product, the material planner may account for co-products and build in the utilization of the co-product when it is generated instead of determine what to do when the co-product is generated. By using the equal edges, the algorithm ensures that the material that should have the same low level codes are assigned the same low level code. The algorithm continues to remain a linear algorithm and thus continues to be efficient even with processing more data. This linear algorithm performs a re-determination of LLCs even for a large amount of BOMs and materials.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include receiving graphs comprising nodes, edges and low level codes. In a computer system the graph comprising nodes, edges and low level codes may be stored or represented in a variety of data structures, such as a table with columns and values, hash tables, linked lists, relational database and so on. When referring to changes in edges and low level codes appropriate values in theses data structures that is represented by a graph having nodes, edges and low level codes may be changed. Thus the embodiments of the present invention are not limited to graphs, nodes or edges.

As noted above, embodiments within the scope of the present invention include program products or logics comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method for re-calculating low level codes for a set of materials, comprising:
    receiving, by a computer, a set of nodes, each node representing a material, the nodes being connected by a first set of edges that represents component-subcomponent relationships between the nodes;
    assigning, by the computer, a low level code to each node by:
        assigning low level codes to nodes that represent components with no subcomponents and have no edges pointing to them; and
        assigning sequential low level codes to nodes that do have edges pointing to them so that low level codes of nodes connected by edges from the first set of edges have sequential low level codes along a path of the edges;
    receiving, via a user interface of the computer, specifications of some of the nodes as co-products;
    generating, by the computer, a second set of edges connecting at least some of the nodes based on their specifications as co-products;
    assigning, by the computer, nodes which are connected by the second set of edges based on their specifications as co-products to equal groups;
    modifying, by the computer, some of the assigned low level codes of some of the nodes by assigning, to nodes within equal groups, a same low level code as at least one other node within the equal group;
    updating, by the computer, some of the assigned low level codes of nodes which are pointed to by edges from the first set of edges extending from nodes for which the low level code was modified to the same low level code as another node within the equal group; and
    outputting the modified low level codes to a user via a display of the computer.

2. The method of claim 1, wherein assigning the same low level code comprises forming at least one equal group, each equal group comprising the number of nodes in the equal group, a list of nodes in the at least one equal group that have been processed, and a low level code for the equal group.

3. The method of claim 1, wherein the modifying some of the low level codes includes assigning, to all of the nodes in the equal group, a highest low level code assigned to any one node in the at least one equal group.

4. The method of claim 1, wherein the same low level code is a highest low level code among the nodes connected by the second set of edges.

5. The method of claim 1, wherein the nodes connected by the second set of edges represent materials that become available at the same time or are produced at the same time.

6. The method of claim 1, wherein the materials connected by the second set of edges are co-products.

7. The method of claim 6, wherein co-products are products that are generated at the same time because they are produced by a single process.

8. A computer-implemented method for re-calculating low level codes for a bill of a plurality of materials, comprising:
    receiving, by a computer, a list of the plurality of materials connected by a first set of edges that each represent a component-subcomponent relationship and a second set of edges that each represent a co-product relationship;
    assigning, by the computer, sequential low level codes to materials connected by the first set of edges representing their component-sub-component relationships;
    assigning, by the computer, the same low level code to each material connected by the second set of edges representing their co-product relationships after assigning the sequential low level codes;

re-calculating, by the computer, the low level codes for the materials based on the first set of edges after assigning the same low level codes based on the second set of edges; and displaying, by the computer, the results of the low level code recalculation to a user.

9. The method of claim 8, wherein the co-product relationship represents materials that are generated at the same time.

10. The method of claim 8, wherein assigning the same low level code comprises forming at least one equal group, each equal group comprising an indication of the number of nodes in the equal group, a list of nodes in the at least one equal group that have been processed, and the low level code for the equal group.

11. The method of claim 10, wherein assigning the same low level code includes assigning the highest low level code to the nodes in the equal group based on both the component-sub-component relationship and the co-product relationship between the nodes.

12. The method of claim 8, wherein assigning the same low level code comprises iteratively traversing the graph and assigning the low level codes to individual nodes.

13. The method of claim 8, wherein displaying the results of the low level code recalculation comprises displaying a previous low level code, the recalculated low level code, and the difference between the previous low level code and the recalculated low level code.

14. A computer system for re-calculating low level codes, comprising:
   a processor configured to execute instructions; and
   a storage device comprising instructions stored thereon that, when executed by the processor, are configured to cause the computer system to implement:
      a low level code calculator configured to:
         receive a list of nodes that represent a plurality of materials connected by a first set of edges that represent component-subcomponent relationships and a second set of edges that represent co-product relationships;
         assign a low level code to each node based on their component-subcomponent relationships; and
         modify the low level codes by assigning, to nodes with co-product relationships, a same low level code as at least one other material with which they have co-product relationships;
      an equal group determination logic configured to form at least one equal group based on the co-product relationships represented by the second set of edges, each equal group comprising:
         an indicator of the number of materials in each equal group,
         a list of materials in the at least one equal group that have been processed, and
         the low level code for the equal group; and
      a user interface configured to display the modified low level codes to a user.

15. The system of claim 14, wherein the low level code for the equal group is a highest low level code assigned to any one node in the at least one equal group.

16. The system of claim 14, wherein the co-product relationship indicates a same time of production for the materials.

17. The system of claim 14, wherein the nodes connected by the second set of edges represent materials that become available at the same time or are produced at the same time.

18. A storage device comprising instructions stored thereon that, when executed by a processor, are configured to cause a computer system to:
   receive, by the computer system, a list of a plurality of materials connected by a first set of edges that each represent a component-subcomponent relationship and a second set of edges that each represent a co-product relationship;
   assign, by the computer system, sequential low level codes to materials connected by the first set of edges representing their component-sub-component relationships;
   assign, by the computer system, the same low level code to each material connected by the second set of edges representing their co-product relationships after assigning the sequential low level codes;
   re-calculate, by the computer system, the low level codes for the materials based on the first set of edges after assigning the same low level codes based on the second set of edges; and
   display, by the computer system, the results of the low level code recalculation to a user.

* * * * *